United States Patent
Dunn et al.

(10) Patent No.: US 11,483,288 B1
(45) Date of Patent: Oct. 25, 2022

(54) SERIALIZATION OF FIREWALL RULES WITH USER, DEVICE, AND APPLICATION CORRELATION

(71) Applicant: Wells Fargo Bank, N.A., San Francisco, CA (US)

(72) Inventors: Justin Dunn, Yadkinville, NC (US); Artemio V. Meras, III, San Antonio, TX (US); Brian Schlemmer, Charlotte, NC (US); Shawn M. Craig, Charlotte, NC (US); Duncan Molony, New Orleans, LA (US); Christopher Houser, Mt. Holly, NC (US); Michael Scott Hopkins, Millstadt, IL (US); Kerrie Heller, Stanley, NC (US); Michael Dutilly, Waxhaw, NC (US); Christy K. Lewis Lester, Brandon, SD (US); Jonathan Louis Gabel, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 334 days.

(21) Appl. No.: 16/570,365

(22) Filed: Sep. 13, 2019

Related U.S. Application Data (63) Continuation-in-part of application No. 15/073,026, filed on Mar. 17, 2016, now abandoned.

(51) Int. Cl.
*H04L 9/40* (2022.01)
*G06F 16/25* (2019.01)
*G06F 16/22* (2019.01)

(52) U.S. Cl.
CPC .......... *H04L 63/0263* (2013.01); *G06F 16/22* (2019.01); *G06F 16/258* (2019.01); *H04L 63/0218* (2013.01); *H04L 63/0838* (2013.01); *H04L 63/20* (2013.01)

(58) Field of Classification Search
CPC ............. H04L 63/0263; H04L 63/0218; H04L 63/0838; H04L 63/20; G06F 16/22; G06F 16/258
See application file for complete search history.

(56) References Cited

U.S. PATENT DOCUMENTS

| | | | |
|---|---|---|---|
| 6,611,869 B1* | 8/2003 | Eschelbeck | H04L 41/0213 707/999.009 |
| 2006/0174337 A1* | 8/2006 | Bernoth | H04L 63/0263 726/11 |
| 2008/0301765 A1* | 12/2008 | Nicol | H04L 63/20 726/1 |
| 2011/0107406 A1* | 5/2011 | Frost | G06F 9/45558 726/6 |
| 2014/0075510 A1* | 3/2014 | Sonoda | H04L 63/105 726/3 |

* cited by examiner

*Primary Examiner* — Jeffrey D. Popham
(74) *Attorney, Agent, or Firm* — Kilpatrick Townsend & Stockton LLP (57) ABSTRACT

Distributed firewalls reside at different points across a network. Each distributed firewall can include one or more rules that govern traffic over and/or access to the network. The rules can be discovered, converted into a standardized format, and indexed at a centralized rule database. The rules or data of the rules can be verified. The rules can be certified at the centralized database. The certification process can be based on a direction of traffic to which the rule governs. The certification process may have different levels based on the direction of traffic.

20 Claims, 10 Drawing Sheets

SERIALIZATION OF FIREWALL RULES WITH USER, DEVICE, AND APPLICATION CORRELATION

CROSS-REFERENCE TO RELATED APPLICATION

This is a continuation-in-part of U.S. application Ser. No. 15/073,026, entitled "SERIALIZATION OF FIREWALL RULES WITH USER, DEVICE, AND APPLICATION CORRELATION," and filed Mar. 17, 2016, the entirety of which is incorporated herein by reference.

BACKGROUND

Distributed networks call for detailed management of a variety of factors. Managing what and/or who has access to an internal network, such as for a business, is often time intensive and complicated. Firewall rules dictate and grant access on an individual user, device, and/or application basis. Further, it is difficult to identify what user, device, and/or application may be utilizing a given firewall rule as well running analysis against large-scale firewall deployments. It is also difficult to certify rules may each govern different types of traffic.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Distributed firewalls reside at different points across a network. Each distributed firewall can include one or more rules that govern traffic over and/or access to the network. The rules can be discovered, converted into a standardized format, and indexed at a centralized rule database. The rules or data of the rules can be verified. The rules can be certified at the centralized database. The certification process can be based on a direction of traffic to which the rule governs. The certification process may have different levels based on the direction of traffic.

In aspects, the subject innovation provides substantial benefits in terms of firewall management and servicing. One advantage resides in a more standardized index of firewall rules and/or policies. Another advantage resides in real time or near real time updating and monitoring and vice versa of new and old firewall rules. Another advantage resides in a robust certification process.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Distributed firewalls reside at different points across a network. Each distributed firewall can include one or more rules that govern traffic over and/or access to the network. The rules can be discovered, converted into a standardized format, and indexed at a centralized rule database. The rules or data of the rules can be verified. The rules can be certified at the centralized database. The certification process can be based on a direction of traffic to which the rule governs. The certification process may have different levels based on the direction of traffic.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to incorporate all modifications, equivalents, and alternatives falling within the spirit and scope of this specification and claims appended hereto.

Figure 1:
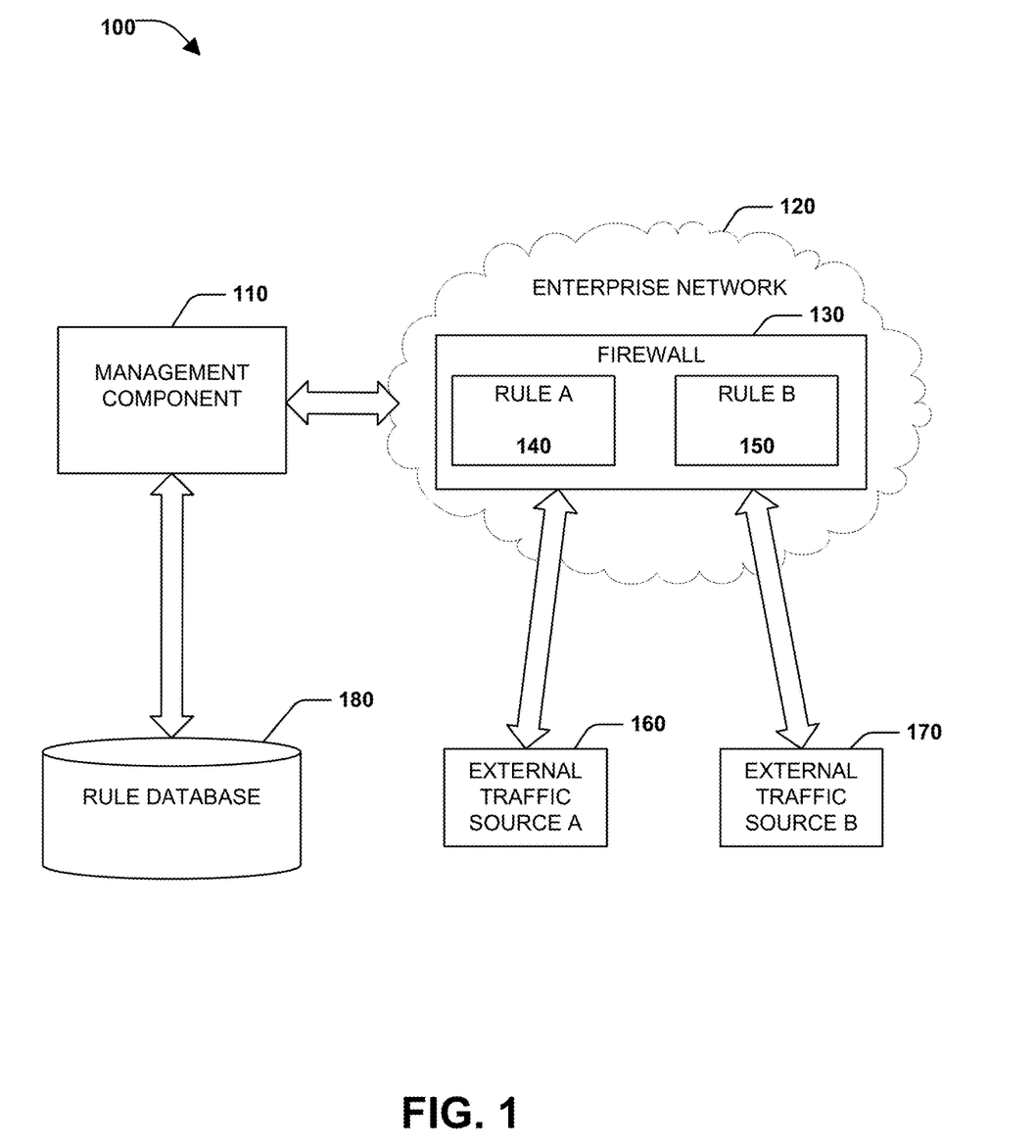
FIG. 1 illustrates an overview diagram for serializing firewall rules.

FIG. 1 illustrates an overview system 100 for serializing firewall rules. The system 100 includes a management component 110. The management component 110 resides or interacts with an enterprise network 120 such as a corporation wide network, intranet, and/or the like. In some embodiments, the enterprise network 120 can be a corporation wide network that provides online services and/or access to corporate sites and/or information.

The management component 110 accesses at least one firewall 130 on the enterprise network 120. In some embodiments, there is more than one firewall managed by an entity throughout the enterprise network 1210. Typically, a firewall is managed by one or more network administrators. The at least one firewall 130 may be distributed across the enterprise network 120 and interact with the network to control access. The management component 110 discovers or mines the at least one firewall 130 across the network for firewall rules. For example, the at least one firewall 130 can include rule A 140 and/or rule B 150. The management component 110 can use data mining algorithms, searching algorithms, and/or the like.

The firewall rules (rule A 140, rule B 150) from the at least one firewall 130 determine what is allowed access to the enterprise network 120 and/or what type of traffic is allowed. The firewall rules (rule A 140, rule B 150) from the at least one firewall 130 control access for internal and/or external users of the network. In some embodiments, rule A 140 can manage access to the enterprise network 120 for an external traffic source A 150 and rule B 150 can manage access to the enterprise network 120 for an external traffic source B 160.

Further, The firewall rules (rule A 140, rule B 150) from the at least one firewall 130 can control access to different parts of the enterprise network 120 such that only part of the network may be available to certain users and/or applications. The firewall rules (rule A 140, rule B 150) from the at least one firewall 130 can be divided according to geographic area, applications, users, user types, and/or a combination thereof, among others.

The management component 110 discovers firewall rules (rule A 140, rule B 150) from the at least one firewall 130. The management component 110 discovers data of the firewall rules (rule A 140, rule B 150) and stores the data of the firewall rules (rule A 140, rule B 150) in a rule database 180. The management component 110 can connect to a mobile network, wired LAN, wireless LAN, an internet network, or the like to transmit communications. The management component 110 connects to a transmission server to send and receive data, alerts, or the like to and from networked devices. In one embodiment, the mode of the communication can be an application programming interface (API), and/or the like. The management component 110 accesses the at least one firewall 130 over the enterprise network 120. In the case of multiple firewalls, the management component 110 accesses each firewall individually, i.e. 1 . . . N, and discovers existing firewall rules from each firewall. The rules can be stored in a rule database 180.

In one embodiment, the management component 110 monitors the at least one firewall 130 for newly created firewall rules. The management component 110 detects a newly created firewall rule at the at least one firewall 130. The management component 110 discovers the new firewall rule and communicates the rule for storage at the rule database 180.

In some embodiments, firewall rules can contain mostly the same data. In other embodiments, different firewalls can dictate firewall rules in different formats. For example, the firewall rule format can vary by firewall manufacturer. The management component 110 converts a firewall rule in a different format into a conventional or standardized format that can be parsed or indexed.

The management component 110 performs operations on the firewall rules or manipulates data of the firewall rules. The management component 110 mines each firewall rule for data to be indexed in the rules database 180. The management component 110 populates data fields of the database, the fields being data categories belonging to each firewall rule. For example, the data and/or data fields can be rule name, source, destination, services, last usage date, hit count, last certification date, last certification status, and/or the like.

The management component 110 creates data-tags for each rule in the rule database 180. The management component 110 parses the data in each data field. The management component 110 converts the parsed data into data-tags, e.g. text strings that can be logged and keyword searched.

The data-tags can be searchable such that rules in the rule database 180 can be easily found according to search criteria. For example, a user can search for all rules with the same destination IP address.

The management component 110 determines assets that are associated with each rule. The management component 110 accesses other data sources, e.g. other network information/sources or the like, to associate a firewall rule to a source, e.g. an application. For example, the management component 110 can include an asset database or be in communication with an asset database residing elsewhere on the network. The asset database can include a device IP address associated with a device of a user. The device IP address can be associated or matched to a source IP address of a rule in the rule database 180 to determine ownership of the rule. The rule will be associated with the specific user device in the rule database 180.

In another example, the management component 110 can read data packets, domain name system (DNS) data, net mask data, and/or network traffic to correlate an application and a firewall rule. The management component 110 can access a data log or monitor traffic for source IP addresses and destination IP addresses. The management component 110 can discover the application that is generating the network traffic. The management component 110 associates the application's generated network traffic read by the management component 110 that has the same source and destination IP addresses as a firewall rule to determine ownership of that rule. The determined ownership of a rule is stored in the rule database 180 in an asset data field and can be data-tagged by the management component 110.

The management component 110 determines whether the source or owner using a particular rule, e.g. the source IP address or an owner associated with a source IP address, is authenticated. The management component 110 can obtain $3^{rd}$ party verification of the rule from an owner. In one embodiment, the management component 110 can generate a 1-time code. The management component 110 sends the 1-time code to the owner over a transmission server having a processor and a memory to a user device. The owner receives the 1-time code on the user device and responds with the code either over the transmission server or at the distributed firewalls 220. The management component 110 receives the 1-time code back from the owner over the transmission server from the user device. The management component 110 determines the sent 1-time code and the received 1-time code match. It is appreciated that this is just one specific example of 3rd party authentication. Other forms of owner authentication are contemplated, such as, but not limited to, voice recognition, image recognition, fingerprint recognition, biometric recognition, and/or the like.

In one embodiment, a network administrator can review each firewall rule in the rule database 180. In other embodiments, verification may be automated to verify the extracted information for correctness and currency. The review can be at time of creation or a periodic review by the network administrator. The management component 110 can include a user interface to receive user input for manipulating or changing data in a data field. The network administrator can make changes to a rule via the management component 110. The network administrator can create a comments data field to attach notes about a particular rule. The network administrator can modify operative parts of a rule in a respective data field. For example, the network administrator can change the destination IP address of a rule in the rule database 180 via the management component 110. The management component 110 can receive the change in the firewall rule and make the change at the at least one firewall 130 over the network such that it becomes operative at the firewall. A detailed verification process is described below.

Figure 2:
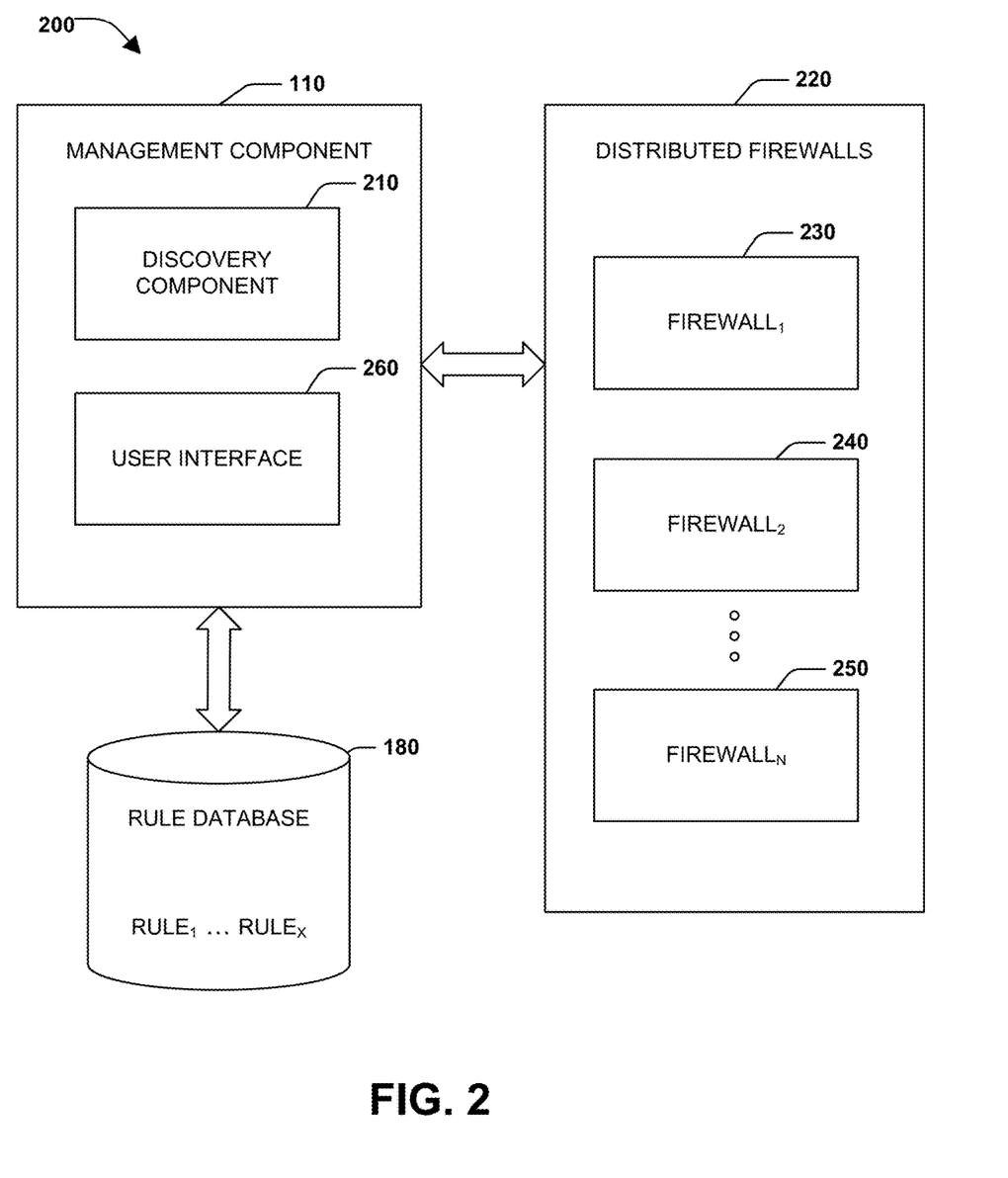
FIG. 2 illustrates a system diagram for serializing firewall rules.

FIG. 2 illustrates a system 200 for serializing firewall rules depicted with a detailed component diagram of the management component 110. In some embodiments, the management component 110 resides or interacts with a network such as a corporation wide network and/or intranet.

The management component 110 includes a discovery component 210. The discovery component 210 accesses one or more distributed firewalls 220. The distributed firewalls 220 are a system of firewalls managed by an entity throughout a network. Typically, a firewall is managed by one or more network administrators. The distributed firewalls 220 are distributed across a network and interact with the network to control access. The distributed firewalls 220 determine what is allowed access to the network or what type of traffic is allowed. In one embodiment, the network can be a corporation wide network that provides online services and/or access to corporate sites and/or information. The firewalls control access for internal and/or external users of the network. Further, the firewalls can control access to different parts of the network such that only part of the network may be available to certain users and/or applications. The firewalls can be divided according to geographic area, applications, users, user types, and/or a combination thereof, among others.

The discovery component 210 discovers or mines the distributed firewalls 220 across the network for firewall rules. The discovery component 210 can use data mining algorithms, searching algorithms, and/or the like. The distributed firewalls 220 are accessed individually by the discovery component 210. For example, the discovery component 210 accesses Firewall$_1$ 230, Firewall$_2$ 240, to Firewall$_N$ 250 of the distributed firewalls 220. Each firewall, i.e. 1 ... N, has a set of firewall rules, e.g. policies, stored locally at the firewall.

Figure 3:
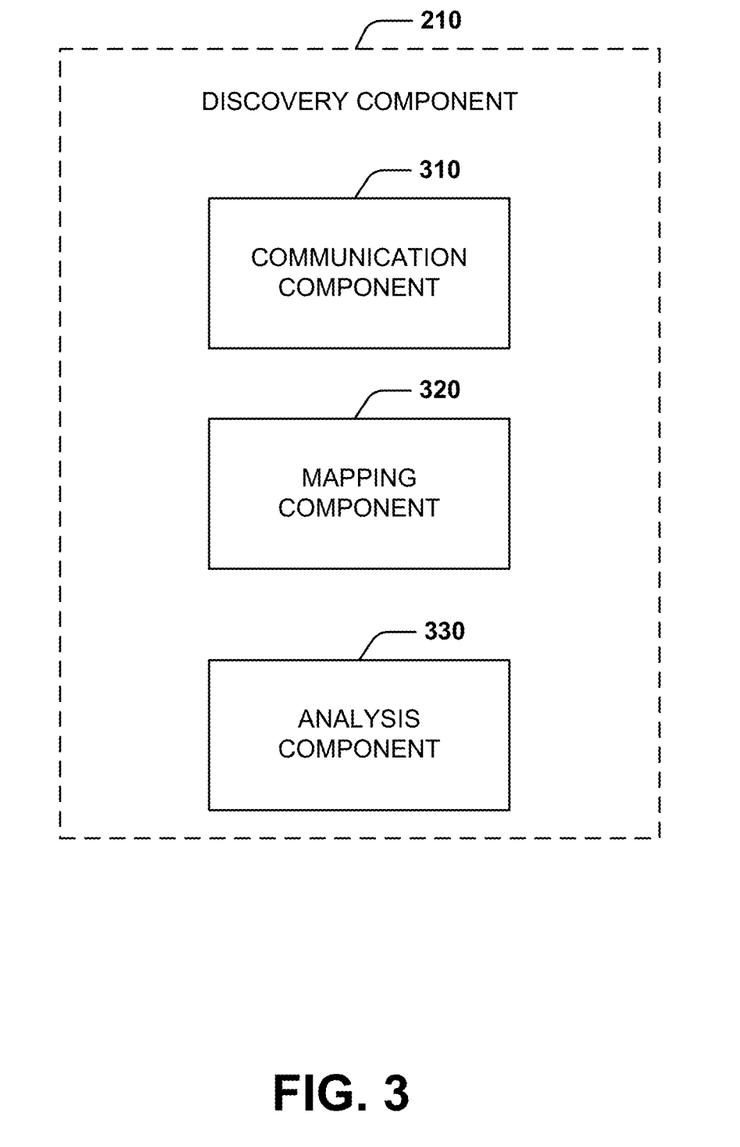
FIG. 3 illustrates an example component diagram of a discovery component.

The discovery component 210 discovers firewall rules from each firewall of the distributed firewalls 220. The discovery component 210 discovers the firewall rules and stores the firewall rules in a rule database 180. With reference to FIG. 3, the discovery component 210 includes a communication component 310. The communication component 310 can connect to a mobile network, wired LAN, wireless LAN, an internet network, or the like to transmit communications. The communication component 310 connects to a transmission server to send and receive data, alerts, or the like to and from networked devices. In one embodiment, the mode of the communication can be an application programming interface (API), and/or the like. The communication component 310 accesses the distributed firewalls 220 over the network. The communication component 310 accesses each firewall individually, i.e. 1 ... N, and discovers existing firewall rules from each firewall. The discovered rules 170 can be stored in a rule database 180.

In one embodiment, the communication component 310 monitors the firewall for newly created firewall rules. The communication component 310 detects a newly created firewall rule at a distributed firewall. The communication component 310 discovers the new firewall rule and communicates the rule for storage at the rule database 180.

In one embodiment, the discovery component 210 includes a mapping component 320. Typically, firewall rules contain mostly the same data; however, different firewalls can dictate firewall rules in different formats. For example, the firewall rule format can vary by firewall manufacturer. The mapping component 320 converts a firewall rule in a different format into a conventional or standardized format that can be parsed or indexed.

Figure 4:
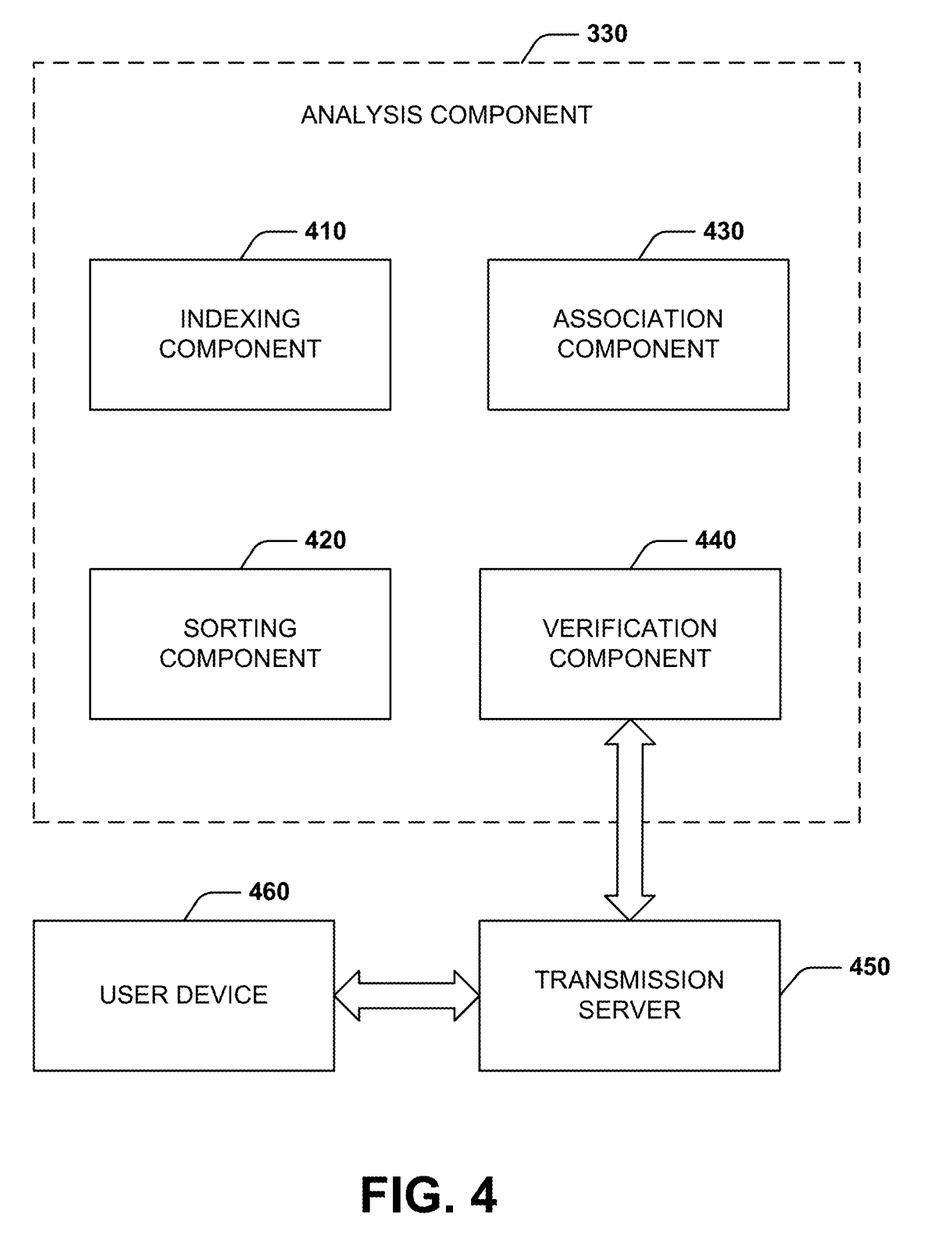
FIG. 4 illustrates an example component diagram of an analysis component.

The discovery component 210 includes an analysis component 330. The analysis component 330 performs operations on the firewall rules or manipulates data of the firewall rules. With reference to FIG. 4 and continuing reference to FIG. 3, the analysis component 330 includes an index component 410. The index component 410 mines each firewall rule for data to be indexed in the database. The index component 410 populates data fields of the database, the fields being data categories belonging to each firewall rule. For example, the data and/or data fields can be rule name, source, destination, services, last usage date, hit count, last certification date, last certification status, and/or the like.

The analysis component 330 includes a sorting component 420. The sorting component 420 creates data-tags for each rule in the rule database 180. The sorting component 420 parses the data in each data field. The sorting component 420 converts the parsed data into data-tags, e.g. text strings that can be logged and keyword searched. The data-tags can be searchable such that rules in the rule database 180 can be easily found according to search criteria. For example, a user can search for all rules with the same destination IP address.

Figure 5:
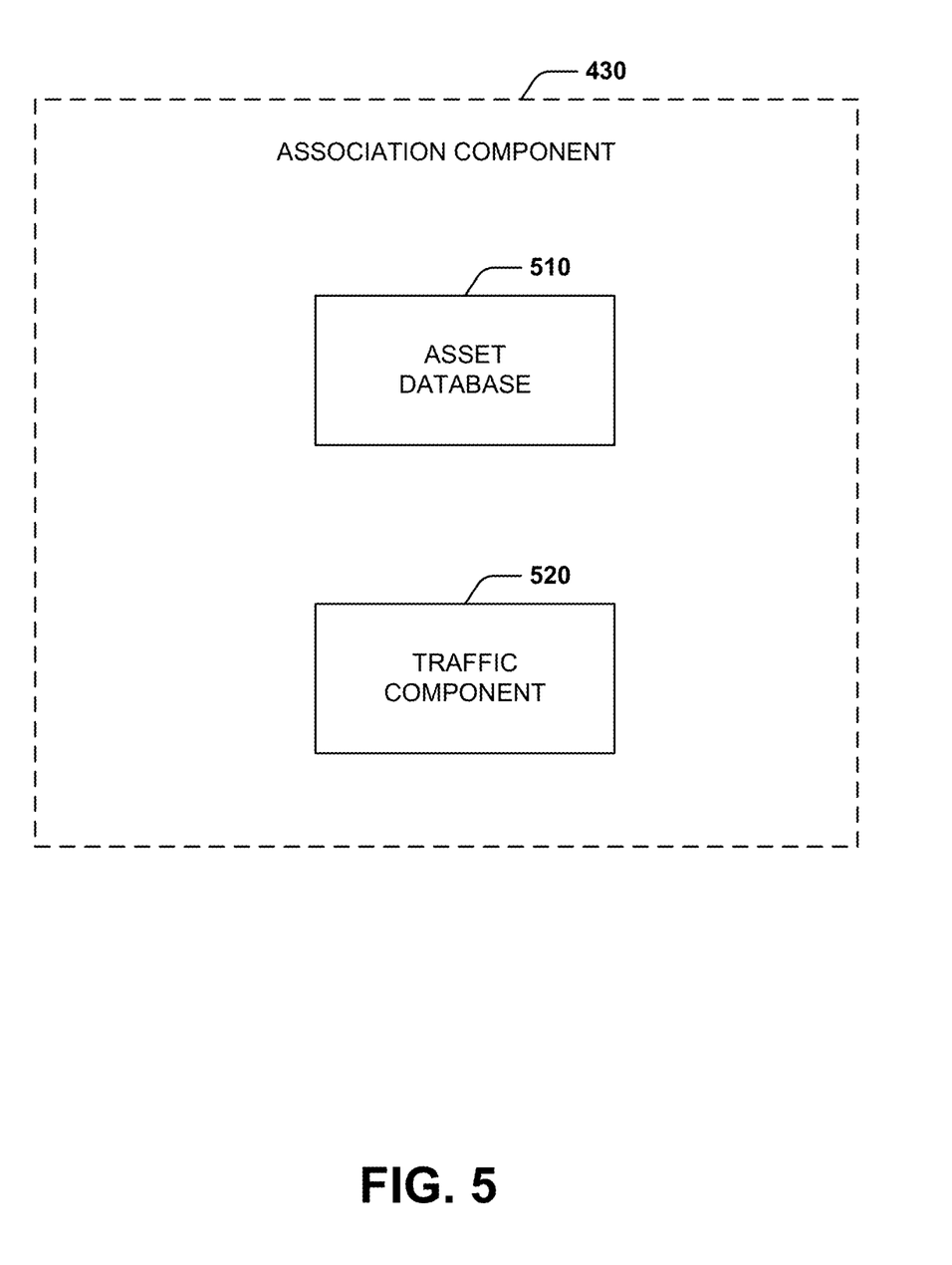
FIG. 5 illustrates an example component diagram of an association component.

The analysis component 330 includes an association component 430. The association component 430 determines assets that are associated with each rule. With reference to FIG. 5, the association component 430 accesses other data sources, e.g. other network information/sources or the like, to associate a firewall rule to a source, e.g. an application. For example, the association component can include an asset database 510 or be in communication with an asset database residing elsewhere on the network. The asset database 510 can include a device IP address associated with a device of a user. The device IP address can be associated or matched to a source IP address of a rule in the rule database 180 to determine ownership of the rule. The rule will be associated with the specific user device in the rule database 180.

In another example, the association component 430 includes a traffic component 520. The traffic component 520 can read data packets, domain name system (DNS) data, net mask data, and/or network traffic to correlate an application and a firewall rule. The traffic component 520 can access a data log or monitor traffic for source IP addresses and destination IP addresses. The traffic component 520 can discover the application that is generating the network traffic. The association component 430 associates the application's generated network traffic read by the traffic component 520 that has the same source and destination IP addresses as a firewall rule to determine ownership of that rule. The determined ownership of a rule is stored in the rule database 180 in an asset data field and can be data-tagged by the sorting component 420.

With continuing reference to FIG. 4, the analysis component 330 includes a verification component 440. The verification component 440 determines whether the source or owner using a particular rule, e.g. the source IP address, is authenticated. The verification component 440 can obtain 3rd party verification of the rule from an owner associated with the source and/or firewall rule. In one embodiment, the verification component 440 can generate a 1-time code. The verification component 440 sends the 1-time code to the owner over a transmission server 450 having a processor and a memory to a user device 460. The owner receives the 1-time code on the user device 460 and responds with the code either over the transmission server 450 or at the distributed firewalls 220. The verification component 440 receives the 1-time code back from the user over the transmission server 450 from the user device 460. The verification component 440 determines the sent 1-time code and the received 1-time code match. It is appreciated that this is just one specific example of 3rd party authentication. Other forms of authentication are contemplated, such as, but not limited to, voice recognition, image recognition, fingerprint recognition, biometric recognition, and/or the like.

With continuing reference to FIG. 1, in one embodiment, a network administrator can review each firewall rule in the rule database 180 to verify the extracted information for correctness and currency. The review can be at time of creation or a periodic review by the network administrator. The management component 110 can include a user interface 260 to receive user input for manipulating or changing data in a data field. The network administrator can make changes to a rule via the user interface 260 of the management component 110. The network administrator can create a comments data field to attach notes about a particular rule. The network administrator can modify operative parts of a rule in a respective data field. For example, the network administrator can change the destination IP address of a rule in the rule database 180 via the user interface 260. The management component 110 can receive the change in the firewall rule and make the change at the distributed firewalls 220 over the network such that it becomes operative at the firewall.

Figure 6:
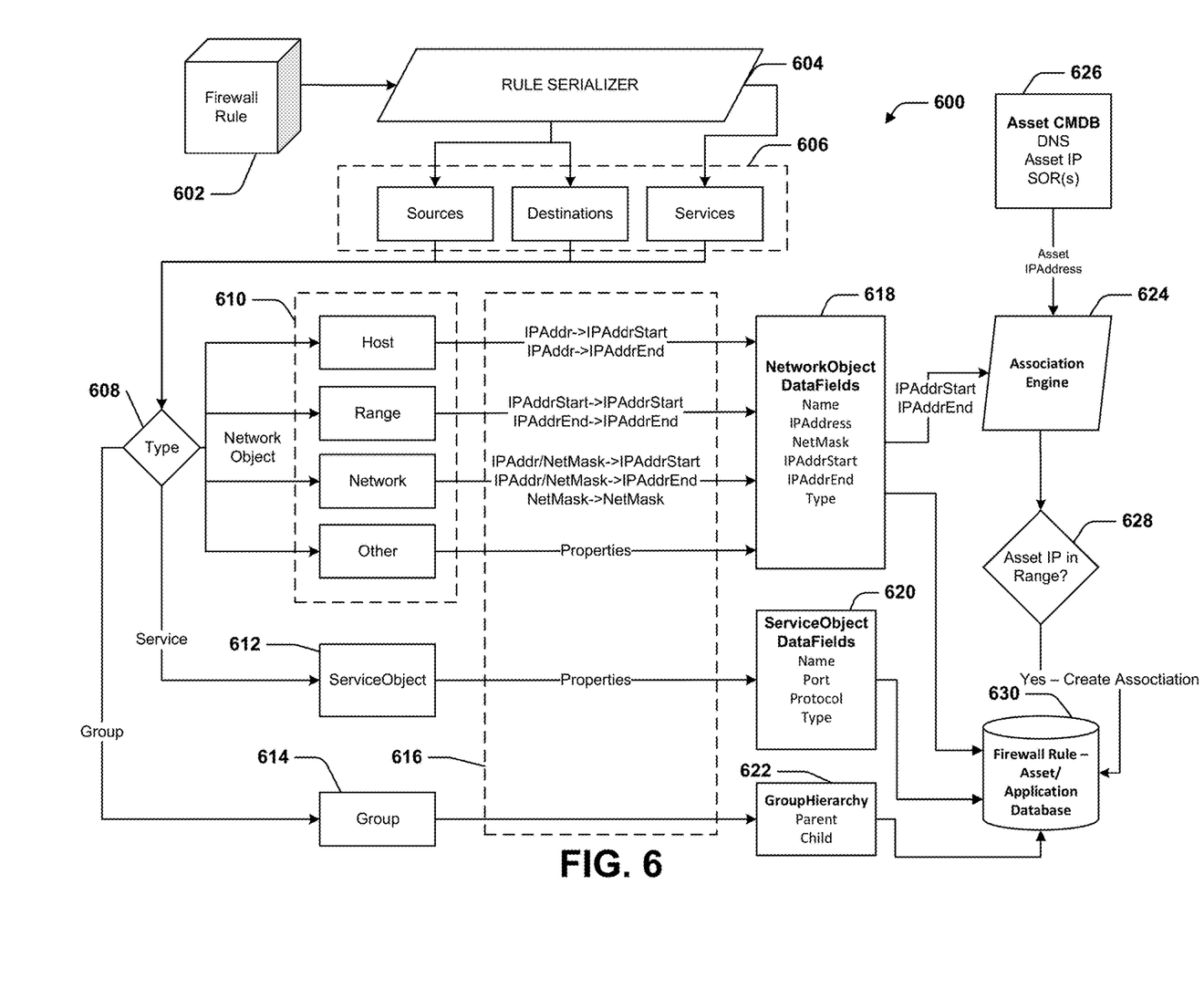
FIG. 6 illustrates an example input/output diagram for a firewall rule in a distributed firewall processed into a rule database with user, device, and/or application correlation.

With reference to FIG. 6, an example input/output diagram 600 is depicted for a firewall rule in a distributed firewall processed into a rule database. The input to the system begins with a firewall rule 602. The firewall rule is passed to a rule serializer 604. The rule serializer 604 divides the firewall rule 602 into smaller data parcels 606. The data parcels 606 for a firewall rule 602 can include a source, a destination, and services. The source can be a starting IP address where network data packets are originated. The destination can be an end IP address where network data packets are directed towards. The service can be the type of network data that can be allowed or denied by the firewall to a network.

Typically, firewall rules include objects. The firewall rule 602 can be parsed into objects, e.g. portions of function data, which define how the firewall rule 602 operates in the firewall. Objects can be classified by object type 608. The object type 608 can be categorized according to function. Object types 608 can be a network object 610, a service object 612, and/or a group 614. A network object 610 can define a host, a range of IP addresses, a network IP address, and/or other. The network object 610 is mapped 616 to NetworkObject DataFields 618. The NetworkObject DataFields 618 are standardized data fields that can be uniform for each rule in a rule database. The NetworkObject DataFields 618 include Name, IPAddress, NetMask, IPAddrStart, IPAddrEnd, Type, among others.

Some objects may not translate directly into each data field. The system can follow a mapping rubric or logic to map object data to an appropriate data field. For example, a host network object includes only one IP address for a host. In the example, the host IP address is mapped 616 to both the IPAddrStart and IPAddrEnd data fields. In another example, a range of IP addresses network object includes a sequential list of IP addresses with a start and an end. The start and end of the range of IP addresses can be mapped 616 to the IPAddrStart and IPAddrEnd data fields respectively. In yet another example, a network IP address object includes an IPAddr/NetMask and a NetMask. The IPAddr/NetMask can be mapped 616 to IPAddrStart and IPAddrEnd data fields, and the NetMask is mapped to the NetMask data field. In another example, another network object includes properties that can be parsed and populate the Network Object DataFields 618.

A service object 612 includes properties that can be mapped 616 to ServiceObject DataFields 620. ServiceObject DataFields 620 can include data fields such as name, port, protocol, type, and/or the like. A group 617 can be mapped 616 to a GroupHierarchy 622. The GroupHierarchy 622 can include data fields such as parent, child, and/or the like.

For network objects 610, the NetworkObject DataFields 618 are passed to an association engine 624. In particular, the IPAddrStart and IPAddrEnd data fields can be passed to the association engine 624. The association engine 624 determines an asset associated with the network object 610. An asset can be an application, user device, account, and/or the like. The association engine 624 accesses an asset configuration management database (CMDB) 626. The asset CMDB 626 includes DNS entries and/or other asset IP SOR information. The association engine 624 associates the IPAddrStart and IPAddrEnd data fields to an asset IPAddress data field in the asset CMDB 626. The association engine 624 can determine 628 whether the asset IP address is within range of the IPAddrStart and IPAddrEnd to determine an association. If within range, an association is created between the network object 610 or firewall rule 602 and the asset. The NetworkObject DataFields 618, ServiceObject DataFields 620, and/or GroupHiearchy 622 are stored in a Firewall Rule-Asset Database 630. The Firewall Rule-Asset Database 630 associates the data fields with the firewall rule 602 and the determined relationship between the asset and the firewall rule 602.

Figure 7:
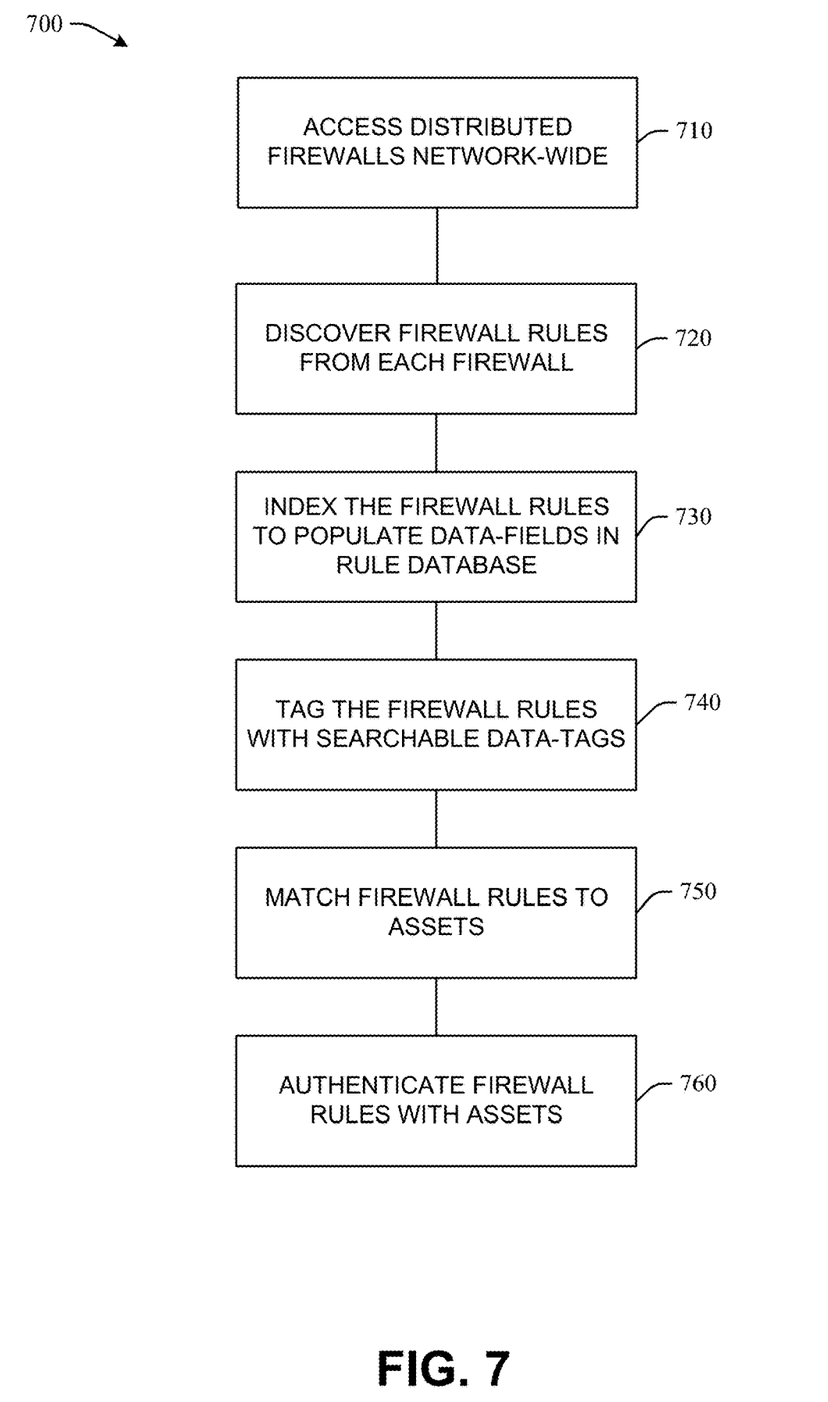
FIG. 7 illustrates a flowchart to serialize firewall rules for a network.

With reference to FIG. 7, an example method 700 is depicted for customer verification of firewall rules. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 700 is described in conjunction with a specific example is for explanation purposes.

In aspects, method 700 can begin at 710 by accessing firewalls that are distributed across a network. Firewall rules are stored locally at each firewall location. For example, a firewall rule residing at a distributed firewall dictates a user device having access to only user account server on the corporate network and not elsewhere on the network. The firewall rule can limit traffic to only data packets that have a source IP address of the user device and a destination IP address of the user account server. At 720, the firewall rules are extracted from each distributed firewall. The firewall rules can be accessed and discovered via an API call and response and/or the like. The firewall rules are extracted to a database. The database can be networked or offline. Continuing the example, the firewall rule is copied at the distributed firewall and stored in the database. At 730, the firewall rules are indexed. The firewall rules are parsed for data. The data is indexed into data fields of a database entry. In the example, the firewall rule is divided into data fields.

The data fields for this specific example can be a rule name, the source IP address, and/or the destination IP address.

At 740, searchable data-tags are created for the firewall rules. The data in each data-field is parsed into text that can be searchable within the database. In the example, the source IP address data field can be parsed and tagged such that it is searchable in the database. The destination IP address and/or the name data fields can be parsed and tagged accordingly. In one embodiment, the IP addresses can be converted to binary to facilitate searching. At 750, the firewall rules can be matched to assets of the rules. For example, an asset can be a user, application, device, and/or the like. Each rule can be associated with an asset. A data-field in the database entry for a particular rule is created and populated with a determined asset. The ownership data-field can be tagged and made searchable in the database. In the example, the asset of the rule can be the user account associated with the user device, or the user device itself. The source IP address and destination IP address can be matched to known source IP address and destination IP address in the user account server as belonging to a particular user account. The user account is associated with the firewall rule in the database.

At 760, the asset can be verified. In some embodiments, to verify a user as an asset, the verification can use $3^{rd}$ party verification to authenticate the user. The verification can be a 1-time code sent to a user device, voice recognition, image recognition, fingerprint recognition, biometric recognition, and/or the like. For example, the associated user account can include a user phone number. A 1-time code can be sent to the user phone number. A user can input the 1-time code in the network when accessing the user account server to verify the association with the rule.

Figure 8:
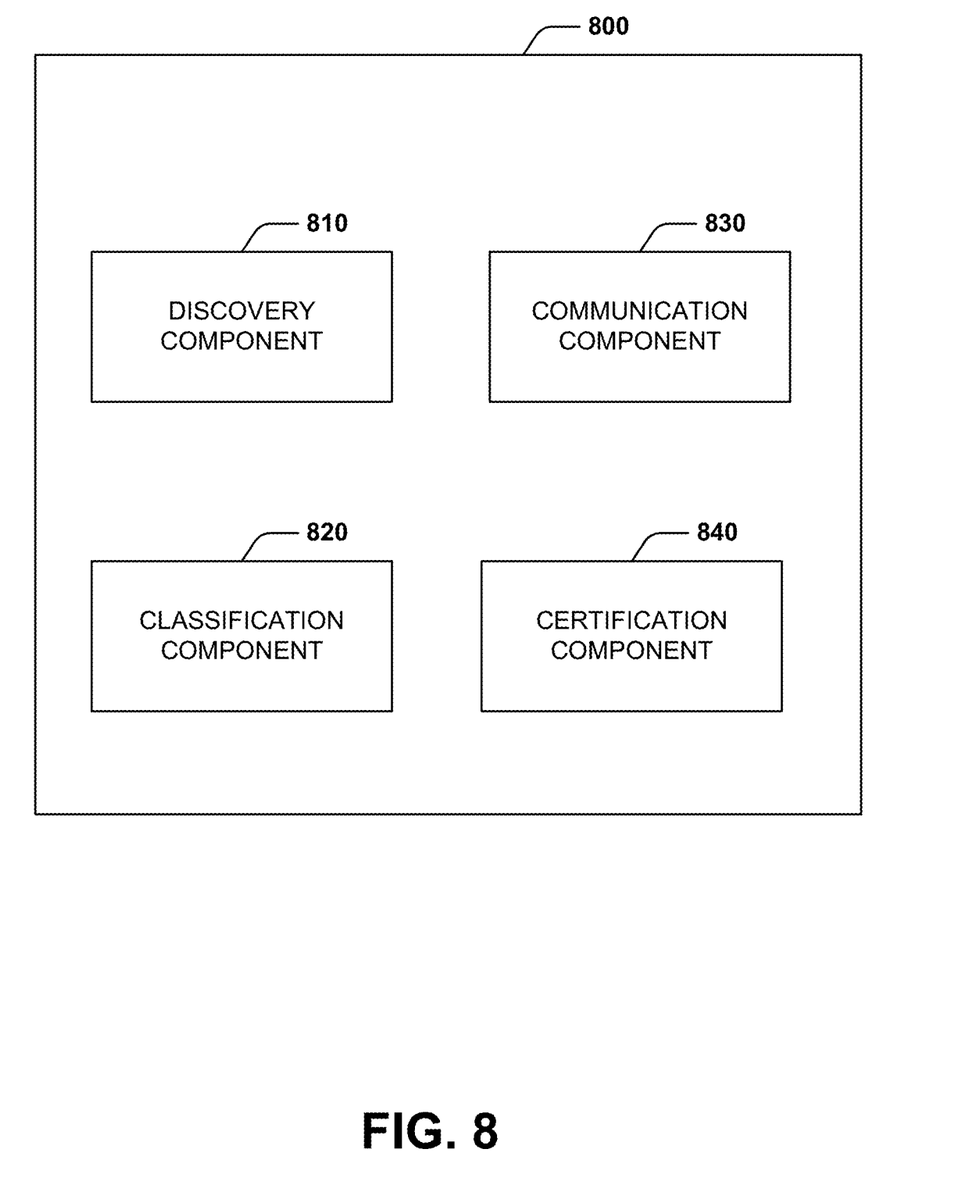
FIG. 8 illustrates a system diagram for certifying firewall rules.

FIG. 8 illustrates a further embodiment of a system 800 for certifying firewall rules. The system 800 includes a discovery component 810. The discovery component 810 discovers a firewall rule from at least one firewall over a network using a search algorithm. The discovery component 810 accesses distributed firewalls as described above. The distributed firewalls are a system of firewalls managed by an entity throughout a network. Typically, a firewall is managed by one or more network administrators. The distributed firewalls are distributed across a network and interact with the network to control access. The distributed firewalls determine what is allowed access to the network or what type of traffic is allowed. In one embodiment, the network can be a corporation wide network that provides online services and/or access to corporate sites and/or information. The firewalls control access for internal and/or external users of the network. Further, the firewalls can control access to different parts of the network such that only part of the network may be available to certain users and/or applications. The firewalls can be divided according to geographic area, applications, users, user types, and/or a combination thereof, among others.

The discovery component 810 discovers or mines the distributed firewalls across the network for firewall rules. The discovery component 810 can use data mining algorithms, searching algorithms, and/or the like. The distributed firewalls can be accessed individually by the discovery component 810. For example, the discovery component 810 accesses Firewall$_1$, Firewall$_2$, to Firewall$_N$ of the distributed firewalls. Each firewall, i.e. 1 . . . N, has a set of firewall rules, e.g. policies, stored locally at the firewall. The discovery component 210 discovers firewall rules from each firewall of the distributed firewalls.

The system 800 includes a classification component 820. In some embodiments, the classification component 820 classifies the firewall rule based on a direction of traffic. A direction of traffic can be inbound traffic, outbound traffic, or exclusively internal traffic. Inbound traffic is network traffic that originates from an external source on an outside network and is being sent to an internal source on the network. Outbound traffic is network traffic that originates from an internal source on the network and is being sent to an external source on an outside network.

In some embodiments, the classification component 820 determines the firewall rule allows inbound traffic from external sources. The external sources reside on an outside network. The classification component 820 can determine information about the firewall rule. The classification component determines whether the firewall rule has been tagged as a publicly accessible application. If a publicly accessible application tag exists, the firewall rule is certified according a standard certification and/or validation process. If a publicly accessible application tag does not exist, a detailed certification and/or validation process is triggered. The classification component 820 creates a publicly accessible application tag for the firewall rule based on the determination of inbound traffic.

The system 800 includes a communication component 830. The communication component 830 requests a detailed certification of the firewall rule. In some embodiments, the communication component 830 generates and sends a notification for the firewall rule based on the publicly accessible application tag. The notification requests a detailed certification of the firewall rule. In some embodiments, the notification is sent to a firewall rule owner, network administrator, and/or the like. In other embodiments, the notification is sent to a publicly accessible application board or a certification board.

In some embodiments, the system 800 includes a certification component 840. The certification component 840 certifies the firewall rule based on the direction of traffic. If the firewall rule does not include a publicly accessible application tag, the certification component 840 determines an owner of the firewall rule. The certification component 840 requests an acknowledgement of the publicly accessible application tag for the firewall rule from the owner. The owner can approve or deny the publicly accessible application tag. If the owner approves of the tag, the approval is sent to a certification board. The certification component 840 receives approval of the firewall rule from the certification board. If the owner denies the tag, the certification component 840 queries the owner to provide reasons and sends the reasons to the certification board. The certification component 840 can receive approval of the tag from the certification board. If approved, the firewall rule is certified according a standard certification and/or verification/validation process.

If the firewall rule exclusively allows traffic from internal sources, or has been certified during the detailed certification, the firewall rule can be verified in a standard process (e.g. a less rigorous process). In some embodiments, the certification component 840 and/or a verification component verifies the firewall rule from an asset of the firewall rule. The certification component 840 determines whether the source using a particular rule, e.g. the source IP address, is authenticated. The certification component 840 can obtain $3^{rd}$ party verification of the ownership of a rule from the owner. In one embodiment, the certification component 840 can generate a 1-time code. The certification component 840 sends the 1-time code to the owner over a transmission server having a processor and a memory to a user device. The owner receives the 1-time code on the user device and responds with the code either over the transmission server or at the distributed firewalls. The certification component 840 receives the 1-time code back from the owner over the transmission server from the user device. The certification component 840 determines the sent 1-time code and the received 1-time code match. It is appreciated that this is just one specific example of $3^{rd}$ party authentication. Other forms of authentication are contemplated, such as, but not limited to, voice recognition, image recognition, fingerprint recognition, biometric recognition, and/or the like.

Figure 9:
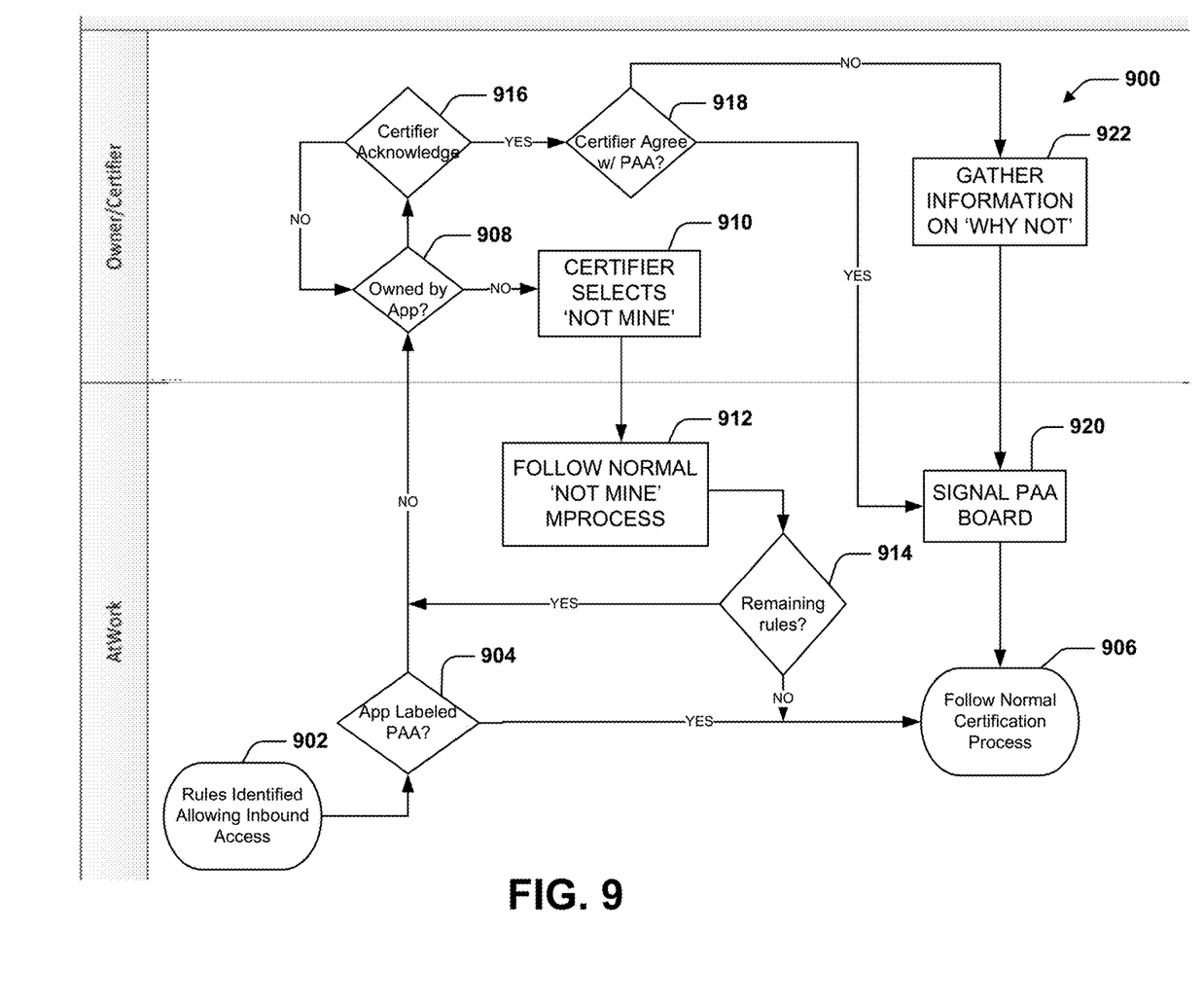
FIG. 9 illustrates a flowchart to certify firewall rules for a network.

FIG. 9 illustrates a method 900. At 902, the firewall rule is determined to allow inbound traffic from external sources. The external sources reside on an outside network. At 904, the firewall rule is analyzed to determine to whether the rule has been tagged as a publicly accessible application. If a publicly accessible application tag exists, at 906, the firewall rule is certified according a standard certification and/or validation process.

If a publicly accessible application tag does not exist, a detailed certification and/or validation process is triggered. At 908, if the firewall rule does not include a publicly accessible application tag, an application owner of the firewall rule is determined and/or confirmed. If the application does not own the firewall rule, at 910, a certifier or certification component can select "not mine." At 912, a "not mine" process is applied. At 914, a check is performed for other firewall rules that are determined to receive detailed certification. If yes, the method returns to 908 for the remaining rules. If no, at 906, the firewall rule is certified according a standard certification and/or validation process.

If the ownership for the firewall rule is confirmed, at 916, an acknowledgement that the owner uses the firewall rule is requested. If no, the method returns to 908 to follow the "not mine" procedure described. If yes, at 918, an acknowledgement of the publicly accessible application tag for the firewall rule is requested from the certifier and/or certification component. The owner can approve or deny the publicly accessible application tag. If the owner approves of the tag, at 920, the approval is sent to a certification board. If the owner denies the tag, at 922, the certifier and/or certification component provides and sends reasons to the certification board at 920. At 920, a signal is sent to the certification board for final approval of the publicly accessible application tag. If approved, at 906, the firewall rule is certified according a standard certification and/or verification/validation process.

A method for serializing firewall rules, comprising: discovering, by a processor, a firewall rule from at least one firewall over a network using a search algorithm; storing the firewall rule in a rule database remote from the firewall; classifying the firewall rule based on a direction of traffic; and certifying the firewall rule based on the direction of traffic.

A system, comprising: a discovery component that discovers, by a processor, a firewall rule from at least one firewall over a network using a search algorithm; a classification component that classifies the firewall rule based on a direction of traffic; and a certification component that certifies the firewall rule based on the direction of traffic.

A computer readable medium having instructions to control one or more processors configured to: discover, by a processor, a firewall rule from at least one firewall over a network using a search algorithm; store the firewall rule in a rule database remote from the firewall; classify the firewall rule based on a direction of traffic; and certify the firewall rule based on the direction of traffic.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
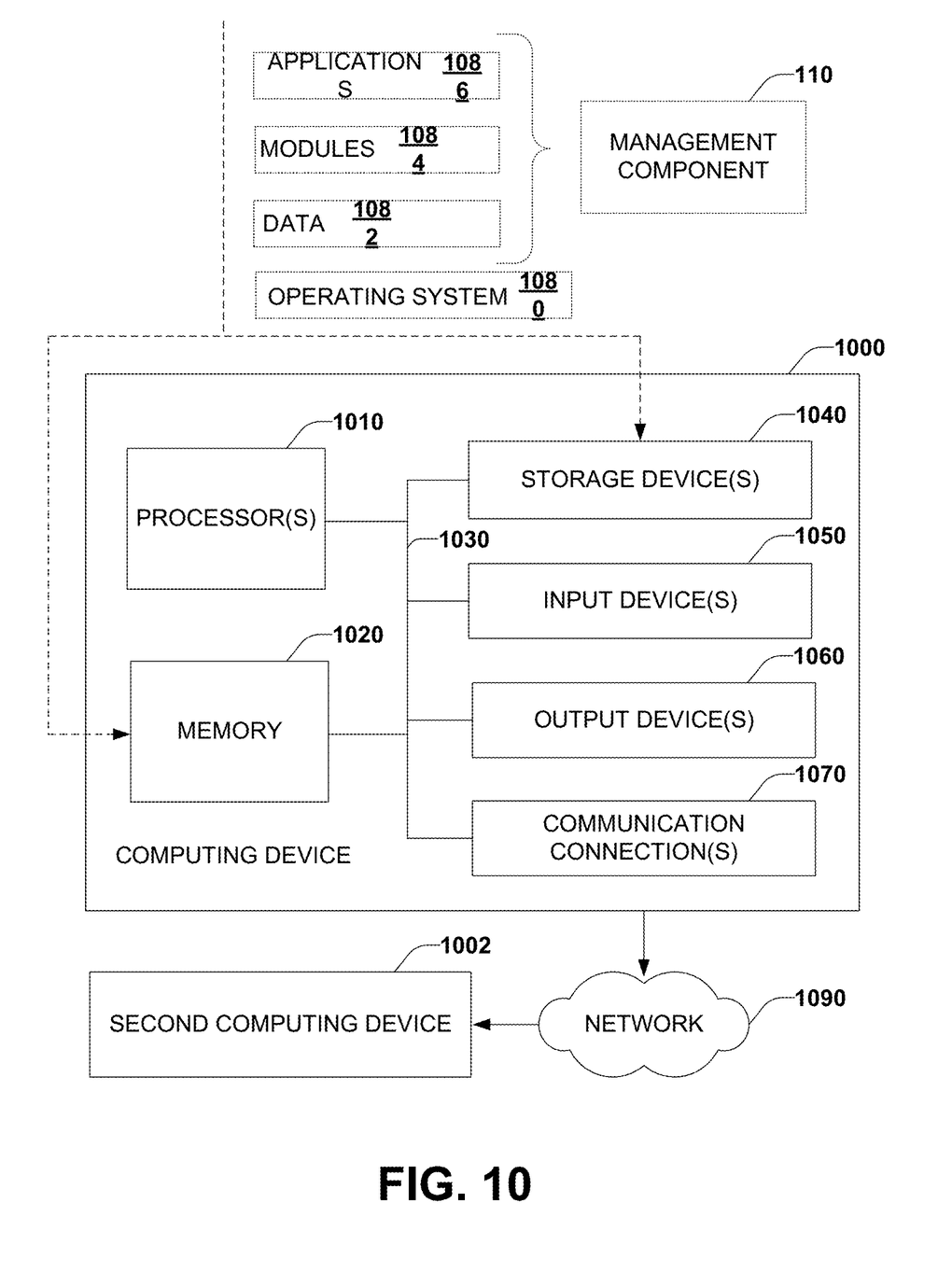
FIG. 10 illustrates a computing environment where one or more of the provisions set forth herein can be implemented, according to some embodiments.

To provide a context for the disclosed subject matter, FIG. 10 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that accessible to the computing device 1000 and includes volatile and non-volatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 820 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the management component 110 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the management component 110 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. For example, the computing device 1000 can correspond to a server that executes functionality of management component 110, and the second computing device 1002 can be a user device that communications and interacts with the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method for serializing firewall rules, comprising:
discovering, by a processor and using a search algorithm, a firewall rule from at least one firewall over a network;
storing the firewall rule in a rule database remote from the firewall;
parsing one or more objects from the firewall rule, the one or more objects including a portion of function data that is included in the firewall rule;
based on the one or more parsed objects, generating one or more data-tags that identify a publicly accessible application associated with the firewall rule;
classifying the firewall rule based on a direction of traffic;
determining that the data-tag identifies the publicly accessible application of the firewall rule; and
responsive to determining the data-tag that identifies the publicly accessible application of the firewall rule, certifying the firewall rule based on the direction of traffic.

2. The method of claim 1, the classifying comprising:
determining that the firewall rule allows inbound traffic from an external source, wherein the external source resides on an outside network.

3. The method of claim 2, comprising:
determining whether the firewall rule has been classified as being associated with the publicly accessible application.

4. The method of claim 3, the classifying comprising:
creating the data-tag that identifies publicly accessible application for the firewall rule based on the determination that the firewall rule allows inbound traffic; and
requesting a detailed certification of the firewall rule.

5. The method of claim 4, wherein requesting the detailed certification comprises:
generating and sending a notification for the firewall rule based on the data-tag that identifies the publicly accessible application, wherein the notification requests the detailed certification of the firewall rule.

6. The method of claim 5, comprising:
determining an owner of the firewall rule; and
requesting and receiving acknowledgement of the data-tag that identifies the publicly accessible application for the firewall rule from the owner.

7. The method of claim 1, comprising:
receiving approval of the firewall rule from a certification board; and
verifying the firewall rule from an asset of the firewall rule.

8. The method of claim 1, wherein the certifying comprises:
determining that the firewall rule exclusively allows traffic from internal sources, wherein the internal sources reside within the network; and
verifying the firewall rule from an asset of the firewall rule.

9. The method of claim 8, wherein the verifying comprises:
generating a 1-time code;
sending, via a transmission server and to a user device, the 1-time code to an owner associated with the asset of the firewall rule;
receiving, via the transmission server and from the user device, the 1-time code back from the owner; and
determining that the sent 1-time code and the received 1-time code match.

10. A system, comprising:
a discovery component that:
discovers, by a processor and using a search algorithm, a firewall rule from at least one firewall over a network,
parses one or more objects from the firewall rule, the one or more objects including a portion of function data that is included in the firewall rule, and
based on the one or more parsed objects, generates one or more data-tags that identify a publicly accessible application associated with the firewall rule;
a classification component that;
classifies the firewall rule based on a direction of traffic, and
determines that the data-tag identifies the publicly accessible application of the firewall rule; and
a certification component that certifies, responsive to determining the data-tag that identifies the publicly accessible application of the firewall rule, the firewall rule based on the direction of traffic.

11. The system of claim 10, wherein the classification component determines that the firewall rule allows inbound traffic from an external source, wherein the external source resides on an outside network.

12. The system of claim 11, wherein the classification component determines whether the firewall rule has been tagged as being associated with the publicly accessible application.

13. The system of claim 12, wherein the classification component creates the data-tag that identifies the publicly accessible application for the firewall rule based on the determination that the firewall rule allows inbound traffic;
the system further comprising a communication component that requests a detailed certification of the firewall rule.

14. The system of claim 13, wherein the communication component generates and sends a notification for the firewall rule based on the data-tag that identifies the publicly accessible application, wherein the notification requests the detailed certification of the firewall rule.

15. The system of claim 14, wherein the certification component:
    determines an owner of the firewall rule; and
    requests and receives acknowledgement of the data-tag that identifies the publicly accessible application for the firewall rule from the owner.

16. The system of claim 15, wherein the certification component:
    receives approval of the firewall rule from a certification board; and
    verifies the firewall rule from an asset of the firewall rule.

17. The system of claim 10, wherein the certification component:
    determines that the firewall rule exclusively allows traffic from internal sources, wherein the internal sources reside within the network; and
    verifies the firewall rule from an asset of the firewall rule.

18. The system of claim 17, wherein the certification component:
    generates a 1-time code;
    sends, via a transmission server and to a user device, the 1-time code to an owner associated with the asset of the firewall rule;
    receives, via the transmission server and from the user device, the 1-time code back from the owner; and
    determines that the sent 1-time code and the received 1-time code match.

19. A non-transitory computer-readable storage medium storing instructions to control one or more processors, wherein, when executed by the one or more processors, the instructions configure the one or more processors to perform operations comprising:
    discovering, by a processor, a firewall rule from at least one firewall over a network using a search algorithm;
    storing the firewall rule in a rule database remote from the firewall;
    parsing one or more objects from the firewall rule, the one or more objects including a portion of function data that is included in the firewall rule;
    based on the one or more parsed objects, generating one or more data-tags that identify a publicly accessible application associated with the firewall rule;
    classifying the firewall rule based on a direction of traffic;
    determining that the data-tag identifies the publicly accessible application of the firewall rule; and
    responsive to determining the data-tag that identifies the publicly accessible application of the firewall rule, certifying the firewall rule based on the direction of traffic.

20. The non-transitory computer-readable storage medium of claim 19, wherein the instructions configure the one or more processors to perform further operations comprising:
    determining that the firewall rule allows inbound traffic from an external source, wherein the external source resides on an outside network;
    determining an owner of the firewall rule; and
    requesting and receiving acknowledgement of a publicly accessible application data-tag for the firewall rule from the owner.

* * * * *